United States Patent [19]

Miyoshi et al.

[11] Patent Number: 5,063,555
[45] Date of Patent: Nov. 5, 1991

[54] ROTARY OPTICAL HEAD

[75] Inventors: Hiroshi Miyoshi, Tokyo; Yoshiteru Kamatani, Kanagawa; Tadashi Ozue, Kanagawa; Tatsuya Narahara, Kanagawa; Kiyoshi Ohsato, Chiba, all of Japan

[73] Assignee: Sony Corporation, Tokyo, Japan

[21] Appl. No.: 618,116

[22] Filed: Nov. 26, 1990

[30] Foreign Application Priority Data

Nov. 27, 1989 [JP] Japan ................................ 1-306866

[51] Int. Cl.$^5$ ............................ G11B 3/74; G11B 7/00
[52] U.S. Cl. .................................. 369/97; 369/44.17; 359/198; 346/139 R
[58] Field of Search ............... 369/44.17, 44.18, 44.19, 369/44.21, 44.14, 97; 360/114; 350/247, 252, 257, 6.5, 6.9, 539; 346/108, 109, 139 R

[56] References Cited

U.S. PATENT DOCUMENTS

| 4,669,070 | 5/1987 | Bell ................................... 369/44.18 |
| 4,807,213 | 9/1989 | Chung et al. ..................... 369/44.18 |
| 4,970,707 | 11/1990 | Hara et al. ...................... 369/44.17 |

FOREIGN PATENT DOCUMENTS

| 0247441 | 12/1987 | European Pat. Off. ......... 369/44.18 |
| 56-13531 | 2/1981 | Japan ............................... 369/44.17 |
| 62-112234 | 5/1987 | Japan ............................... 369/44.14 |

Primary Examiner—Roy N. Envall, Jr.
Assistant Examiner—Thai Tran
Attorney, Agent, or Firm—Lewis H. Eslinger; Jay H. Maioli

[57] ABSTRACT

A rotary optical head apparatus comprises a first rotary member carrying an objective lens and a second rotary member carrying an image rotator. The two rotary members are supported for rotation by means of a single common support shaft so that the axes of rotation of the two rotary members coincide with each other with a high degree of accuracy. Consequently, the linearity of a scanning line of a beam spot which is scanned on an optical magnetic tape is ensured with a high degree of accuracy.

9 Claims, 8 Drawing Sheets

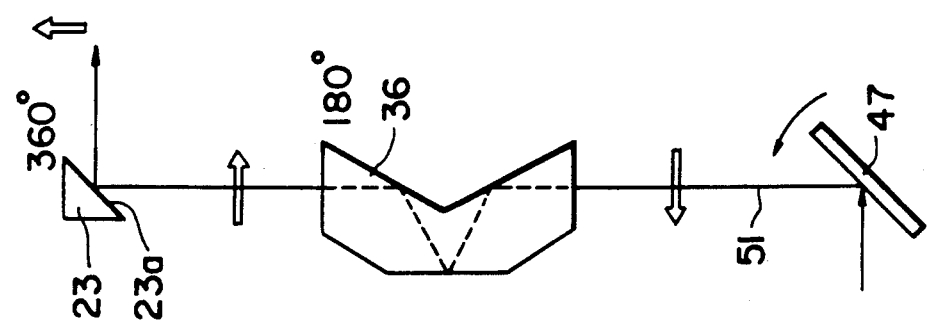
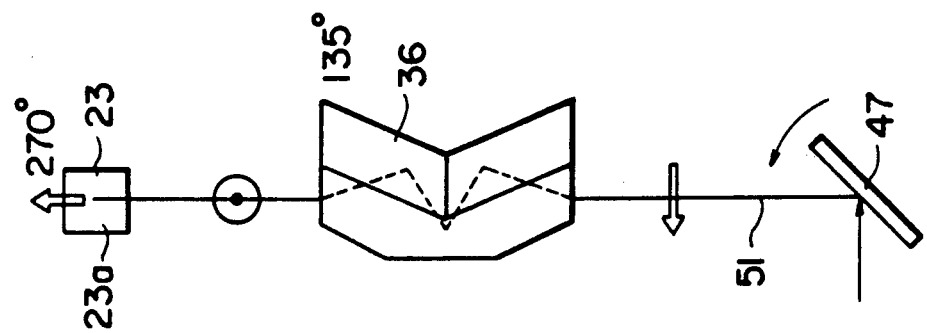
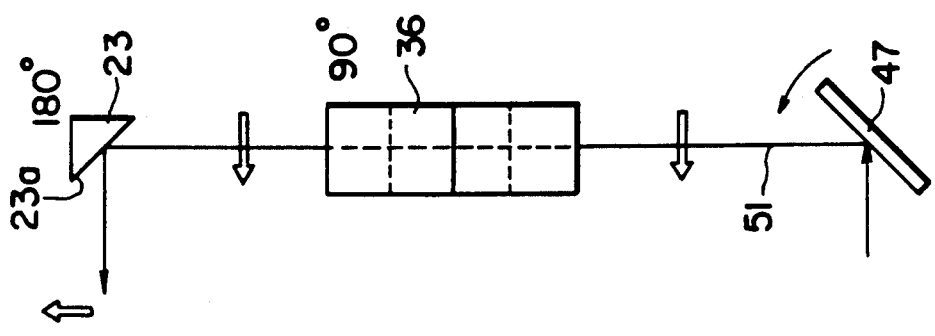
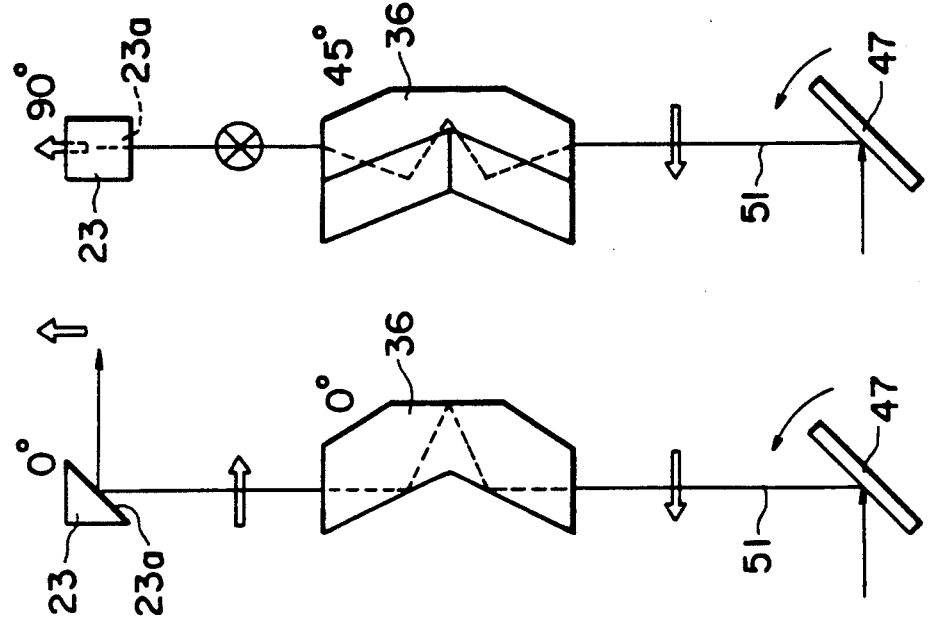

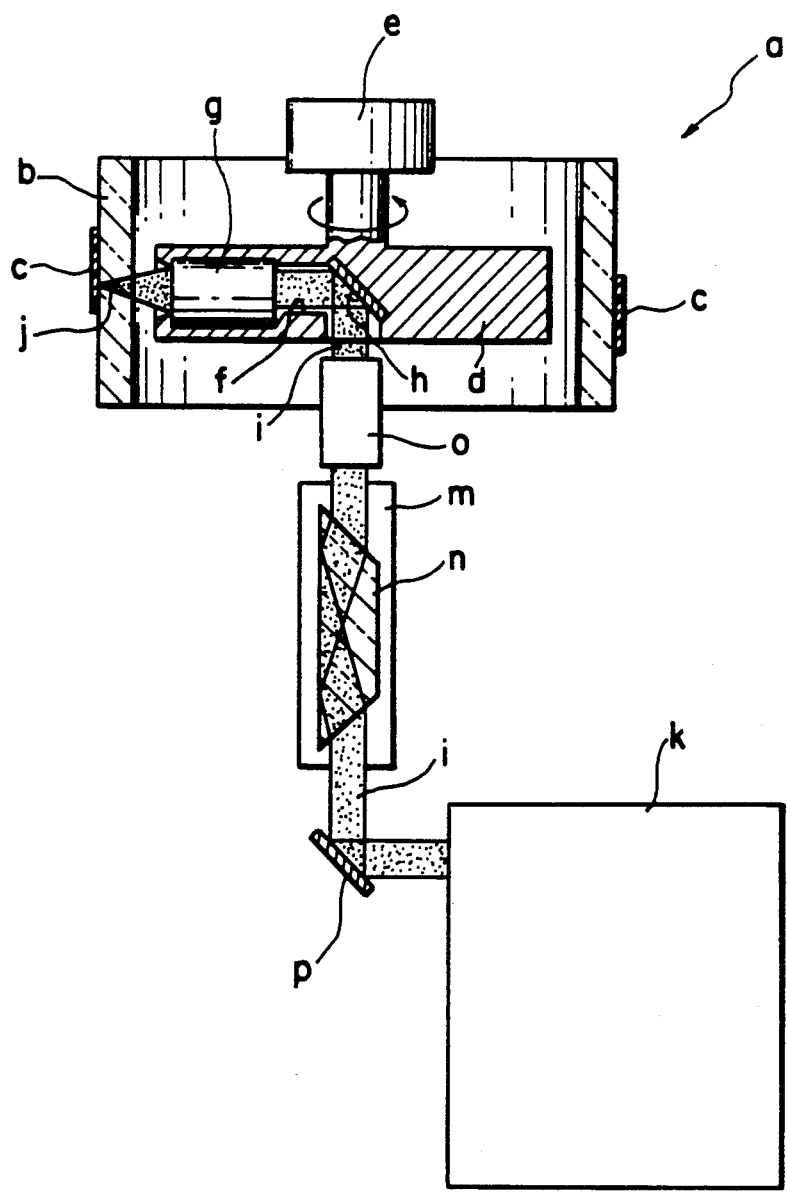

ROTARY OPTICAL HEAD

BACKGROUND OF THE INVENTION

1. Field of the Invention

This invention relates to a novel rotary optical head apparatus, and particularly to a rotary optical head apparatus for use with an optical recording and reproducing apparatus of the tape type wherein a beam spot of a laser beam scans an optical record medium in the form of a tape while the tape is advanced to effect recording and/or reproduction of a signal. More specifically, the present invention relates to a rotary optical head apparatus which includes a rotary member carrying thereon an objective lens adapted to focus a laser beam on an optical record medium in the form of a tape such, for example, as a magneto-optical tape, and another rotary member carrying thereon an image rotator interposed in a beam path of a laser beam to the objective lens, that is, a prism for maintaining a corresponding relationship between the direction of deflection of a laser beam and the direction of movement of a beam spot. The present invention provides a novel rotary optical head apparatus wherein a support structure for two rotary members such as those described above is improved so that axes of rotation of the two rotary members can coincide with each other with a high degree of accuracy and the linearity of a scanning line of a beam spot to be scanned on an optical record medium in the form of a tape can be ensured with a high degree of accuracy.

2. Description of the Prior Art

An optical recording and reproducing system is already known wherein information in the form of a signal is written onto an optical record medium and such recorded information is reproduced using the energy of a laser beam.

Recording and reproducing systems of the type mentioned have been partly put into practical use, but they use a record medium of the disk type: that is, an optical disk. On the other hand, several attempts have also been made to use a record medium of the tape type.

FIG. 9 shows a typical conventional rotary optical head apparatus employed in recording and reproducing apparatus in which an optical record medium in the form of a tape is used. The rotary optical head apparatus shown is generally denoted at a and includes a tape winding drug b formed from a transparent material and having a generally cylindrical profile. When an optical record medium in the form of a tape, that is, an optical record tape c, is to be recorded or reproduced, it is wound substantially spirally over a predetermined winding angle around an outer periphery of the tape winding drum b and is fed by the tape winding drum b. The rotary optical head apparatus a further includes a first rotary member d in the form of a thick disk mounted on the inside of the tape winding drum b and connected to a motor e by which it can be rotated. The first rotary member d has a light-passing hole f formed radially therein. The hole f opens on the radially inner side thereof to a central portion of a lower face of the first rotary member d and on the radially outer end thereof to an outer periphery of the first rotary member d. A lens holder g carrying therein an objective lens set (not shown) is disposed adjacent to the radially outer end of the light-passing hole f. A mirror h mounted in the light-passing hole f is inclined at an angle of 45 with respect to the axis of the light-passing hole f. Thus, a laser beam i introduced from below and impinging on the mirror h is focused by the objective lens in the lens holder g so that it forms a beam spot j of a predetermined diameter on a record face of the optical record tape c wound around the transparent tape winding drum b.

The rotary optical head apparatus a further includes an optical block k which includes a laser light source, a collimator lens, a beam splitter, an optical detector and so forth (not shown). The rotary optical head apparatus a further includes a galvanomirror for the tracking servo, a second rotary member m carrying an image rotator n thereon and connected to be rotated by a motor (not shown), and a focusing block o including a focusing lens and so forth (not shown). The galvanomirror p, second rotary member m and focusing block o are arranged on the axis of rotation of the first rotary member d.

A laser beam i radiated from the optical block k impinges on and is reflected by the galvanomirror p. The galvanomirror p changes the direction of propagation of the laser beam i by a substantially right angle. The laser beam i then successively passes through the image rotator n and focusing block o and impinges on the reflecting mirror h so that it is focused upon the record face of the optical record tape c as described above. Thus, when the optical record tape c is advanced and the first rotary member d is rotated, the beam spot j of the laser beam i scans the record face of the optical record tape c in a direction oblique to the direction of advance of the optical record tape c. Consequently, recording of a signal is effected while forming a helical record track or reading of a recorded signal is effected while the beam spot j of the laser beam i scans a previously-formed record track.

When the galvanomirror p is rocked about a certain pivot axis (not shown), the beam spot j moves on the optical record tape c in a direction substantially perpendicular to the direction in which the record track extends. However, while the galvanomirror p is mounted so as not to rotate about the axis of the first rotary member d, the reflecting mirror h normally rotates about that axis. Consequently, the direction of deflection of the laser beam i caused by the rocking motion of the galvanomirror p does not coincide with the direction of movement of the beam spot j. The image rotator n is a prism for correcting such non-coincidence, and the second rotary member m carrying the image rotator n thereon is rotated at an angular velocity equal to one-half the angular velocity of the first rotary member d. Consequently, coincidence is normally kept between the direction of deflection of the laser beam i by the galvano-mirror p and the direction of movement of the beam spot j.

Rotary optical head apparatus as described above is disclosed, for example, in Japanese laid-open patent publication No. 112234/1987.

In such rotary optical head apparatus a, it is very important that the axis of rotation of the first rotary member d and the axis of rotation of the second rotary member m be aligned with each other with a high degree of accuracy.

In particular, if the axes of rotation are not in register with each other or are inclined relative to each other, in other words, if they are not colinear, then the position at which the laser beam i reflected by the galvanomirror p impinges on the reflecting mirror h varies cyclically, and consequently the beam spot j oscillates cyclically in both the direction of the advance and the widthwise direction of the optical record tape c. Consequently, the linearity of the scanning line of the beam spot j deteriorates significantly, which causes a significant tracking error.

OBJECTS AND SUMMARY OF THE INVENTION

An object of the invention is to provide a remedy for the problems of the prior art noted above. In particular, an object of the invention is to provide a rotary optical head apparatus wherein coincidence between axes of rotation of two rotary members is always ensured, thereby maintaining the linearity of a scanning line of a beam spot of a recording/reproducing beam and eliminating a significant source of tracking error.

The foregoing and other objects of the invention are attained in a preferred embodiment thereof by the provision of a rotary optical head apparatus comprising: objective lens means; beam generating means for generating a beam for propagation to the objective lens means along a beam path; first rotary means mounting the objective lens means; image rotator means; second rotary means mounting the image rotator means in the beam path; support shaft means for commonly supporting the first and second rotary means for rotation about a common axis; first driving means for rotating the first rotary means together with the objective lens means about the axis at a given rotational speed; and second driving means for rotating the second rotary means together with the image rotator means about the axis at a speed equal to one-half the given rotational speed.

In rotary optical head apparatus according to the invention, the coaxial condition between a portion of the support shaft means at which the first rotary means is supported and another portion of the support shaft means at which the second rotary means is supported is ensured with a high degree of accuracy in working or shaping of the support shaft means. Accordingly, the axes of rotation of the two rotary means which are supported on such support shaft means, or in other words, the center of rotation of the objective lens and the center of rotation of the image rotator, coincide with each other with a high degree of accuracy. Consequently, the linearity of a scanning line of a recording/reproducing beam that scans a record medium is ensured with a high degree of accuracy.

The foregoing and other objections, features and advantages of the present invention will become apparent from the following description and the appended claims, taken in conjunction with the accompanying drawings.

BRIEF DESCRIPTION OF THE DRAWING

FIGS. 8A-8E are diagrammatic views illustrating the relationship between (a) the difference in phase of rotation between a reflecting mirror and the image rotator of the rotary optical head apparatus of FIG. 1 and (b) the direction of deflection of a laser beam; and FIG. 9 is an axial or vertical sectional view showing a conventional rotary optical head apparatus.

DESCRIPTION OF THE PREFERRED EMBODIMENTS

Figure 1:
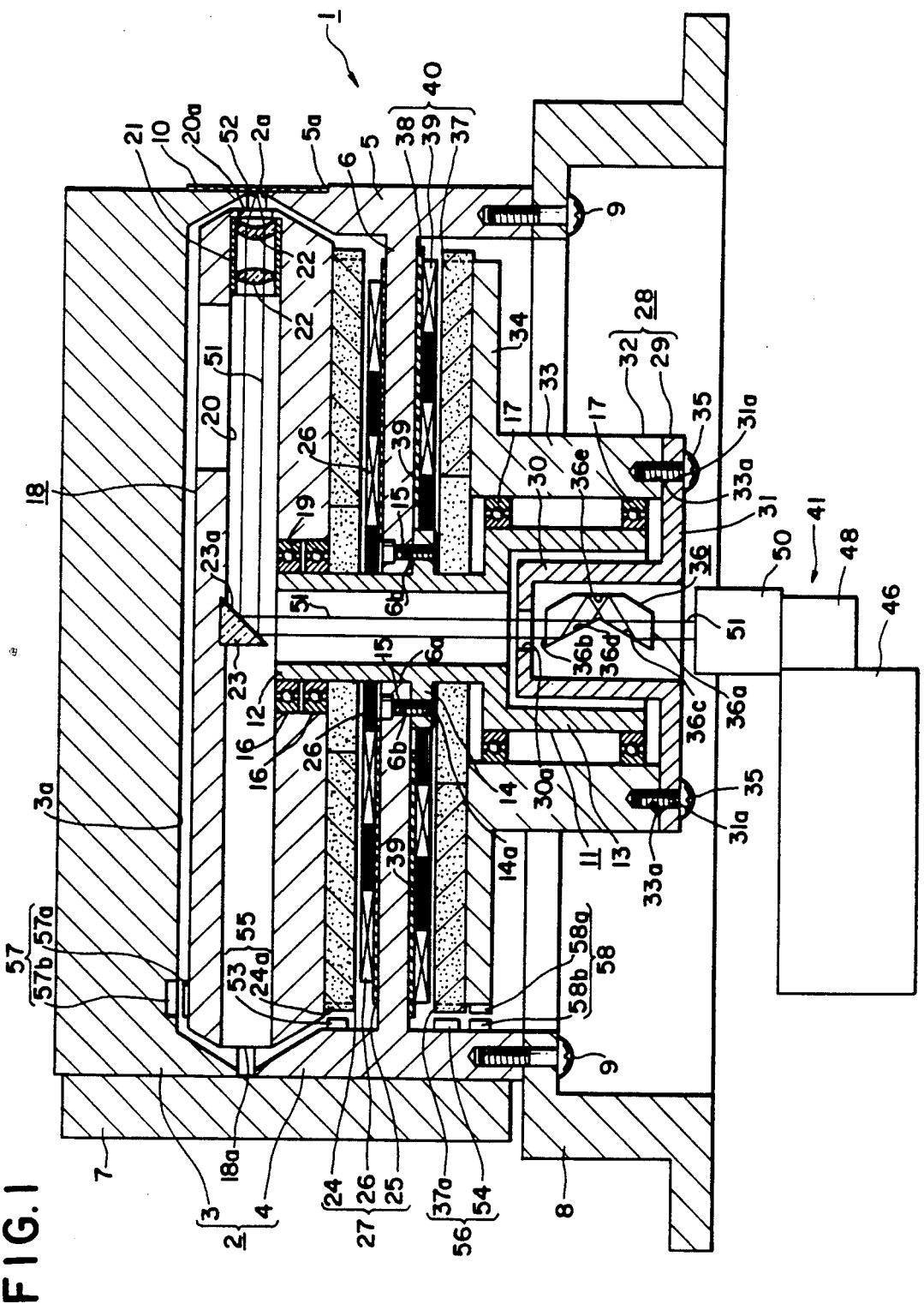
FIG. 1 is an axial or vertical sectional view of a rotary optical head apparatus to which the present invention is applied.
Figure 2:
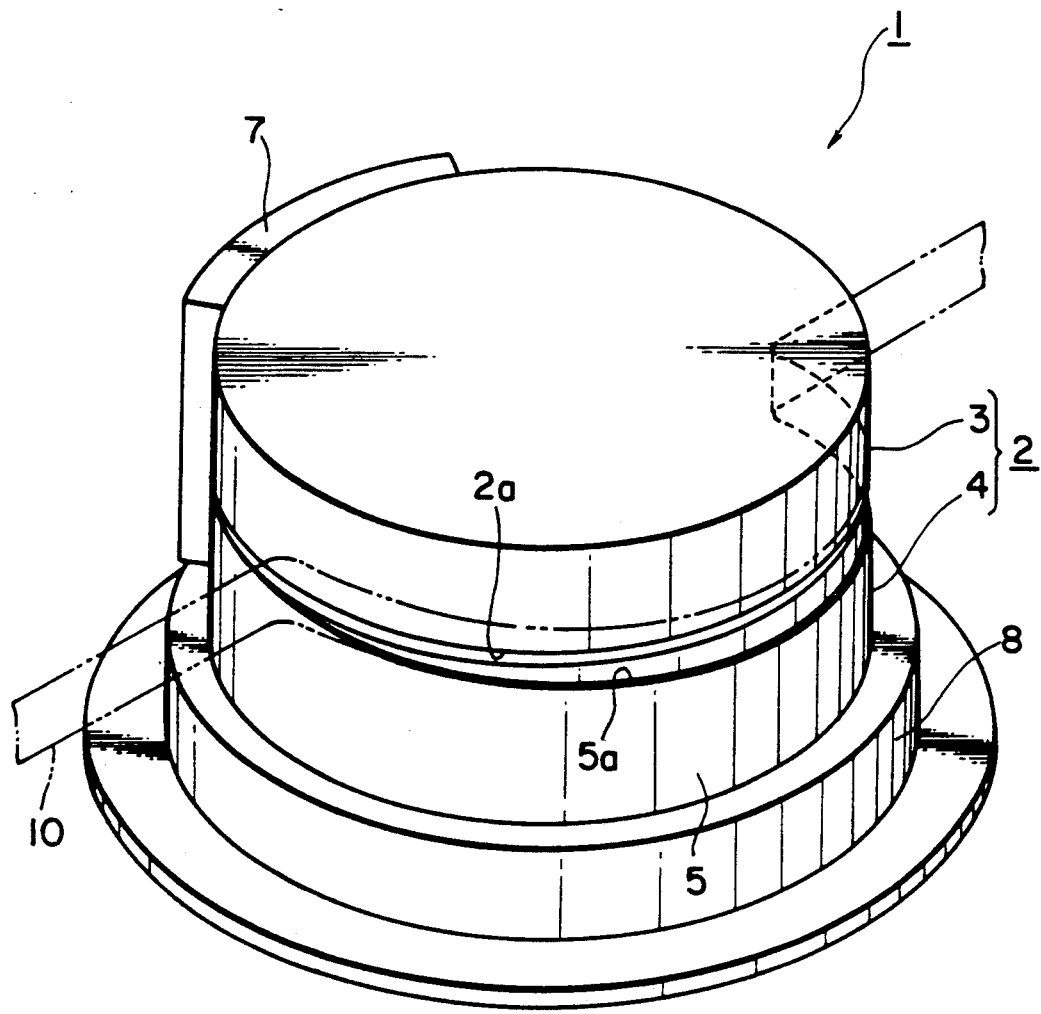
FIG. 2 is a perspective view of the rotary optical head apparatus of FIG. 1.
Figure 3:
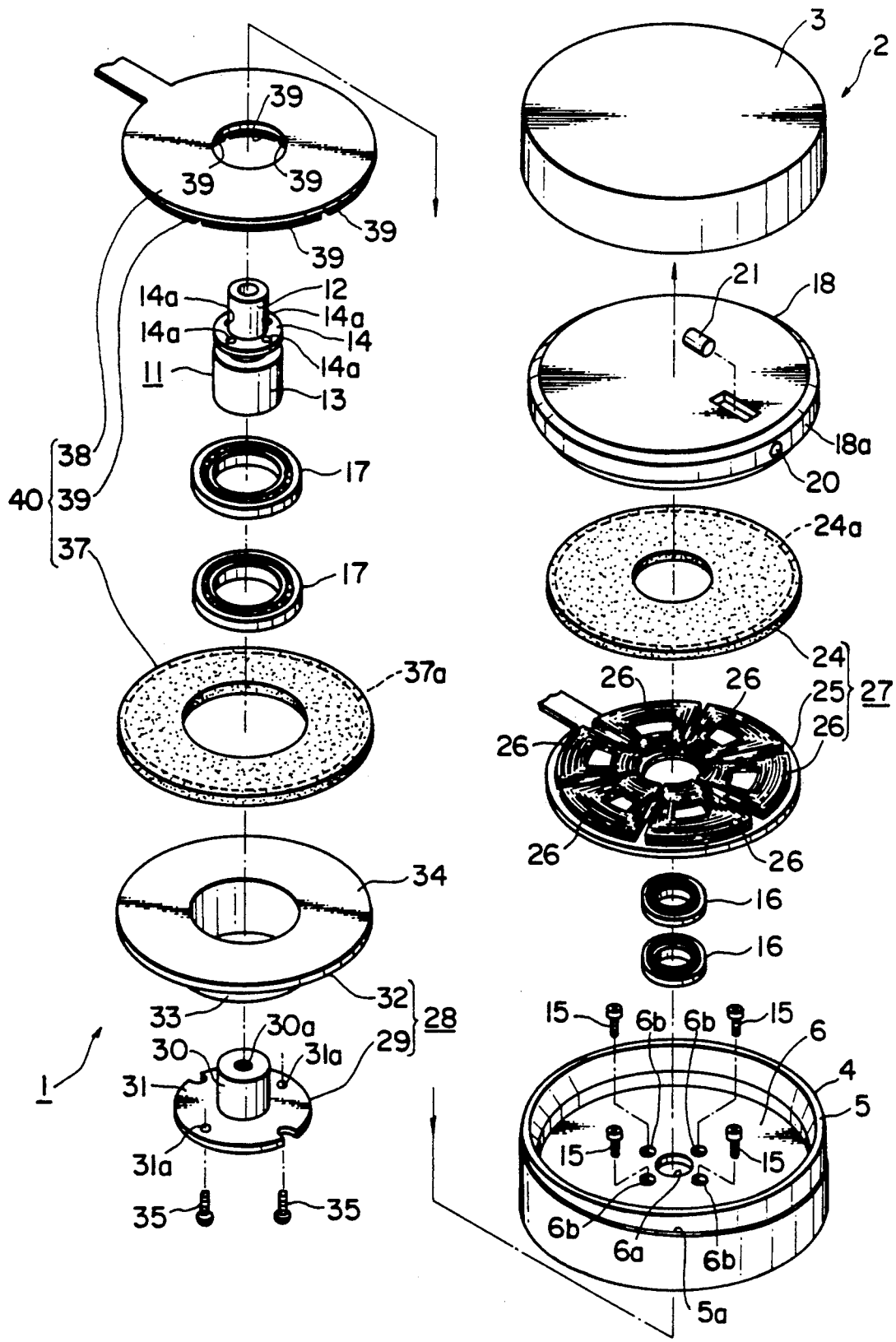
FIG. 3 is a fragmentary perspective view of the rotary optical head apparatus of FIG. 1.

FIGS. 1-3 show a rotary optical head apparatus to which the present invention is applied. The rotary optical head apparatus shown is generally denoted at 1 and includes a tape winding drum 2 including an upper drum member 3 and a lower drum member 4 disposed in a coaxial relationship to each other.

The upper drum member 3 is formed as a thick disk, and a deep recess 3a is formed in the lower face thereof, leaving an annular axial projection or rib along an outer circumferential edge thereof.

The lower drum member 4 has an outer circumferential wall 5 and an inner wall 6. The outer wall 5 has a cylindrical profile and an axial length that is small compared to its diameter. The inner wall 6 has a substantially disk-like or radial profile and is formed in an integral relationship with the outer circumferential wall 5. The inner wall 6 is disposed so that it divides the inside of the outer circumferential wall 5 into two sections in the axial direction. A circular support shaft fitting hole 6a is formed at the center of the inner wall 6 of the lower drum member 4, and a plurality of screw receiving holes 6b are formed at inner circumferential edge portions of the inner wall 6 around the support shaft fitting hole 6a. A lead portion 5a in the form of a shallow recess is formed on an outer periphery along the upper end of the outer circumferential wall 5 of the lower drum member 4 so that a lower side edge thereof extends substantially in a spiral shape as seen in FIGS., 2 and 3.

An inner circumferential face of the recess 3a of the upper drum member 3 is tapered downwardly and outwardly, and an upper end portion of an inner circumferential face of the outer circumferential wall 5 of the lower drum member 4 is tapered upwardly and outwardly, as particularly seen in FIG. 1.

The rotary optical head apparatus 1 further includes a drum connecting member 7 having an upper portion and a lower portion secured to outer peripheral portions of the upper and lower drum members 3 and 4, respectively, to connect the upper and lower drum members 3 and 4 in a coaxial opposing relationship to each other with a small gap 2a left therebetween.

The tape winding drum 2 is supported on a drum supporting table 8 secured to a chassis or other suitable base member (not shown), and the outer circumferential wall 5 of the lower drum member 4 is secured to an upper end portion of the drum supporting table 8 by means of several fastening screws 9.

Thus, an optical record tape 10 such, for example, as a magneto-optical tape having a thin magnetic film formed on a face thereof is fed by the tape winding drum 2 in a condition wherein it is wound over a predetermined winding angle (over about 180° in FIG. 2) on the outer periphery of the tape winding drum 2.

As FIGS. 1 and 3 show, the rotary optical head apparatus 1 further includes a support shaft 11 supporting two rotary members 18 and 28, which will be hereinafter described, for rotation thereon.

The support shaft 11 has upper and lower cylindrical portions 12 and 13 and a mounting flange 14 which are formed in an integral relationship with one another and have a common axis. The cylindrical portion 12, hereinafter referred to as the first cylindrical portion, is a little longer than the other cylindrical portion 13, hereinafter referred to as the second cylindrical portion. On the other hand, the first cylindrical portion 12 has a smaller outer diameter than the second cylindrical portion 13. The mounting flange 14 is formed on and extends radially outwardly from a portion that is axially located a little below a mid-portion of the first cylindrical portion 12, and a plurality of threaded holes 14a are formed in a circumferential row in the mounting flange 14.

The support shaft 11 can be formed by machining a suitable metal using a lathe or the like. Consequently, the coaxial relation between the two cylindrical portions 12 and 13 can be ensured with a high degree of accuracy.

The support shaft 11 is secured in a coaxial relationship to a central portion of the tape winding drum 2. In particular, the first cylindrical portion 12 of the support shaft 11 is fitted from below in the support shaft fitting hole 6a formed in the inner wall 6 of the lower drum member 4, and a plurality of screws 15 are inserted from above in the screw fitting holes 6b formed in the inner wall 6 and are screwed into the threaded holes 14a of the mounting flange 14 to secure the support shaft 11 to a central portion of the inner wall 6 of the lower drum member 4.

The first cylindrical portion 12 of the support shaft 11 is positioned so that an upper portion thereof projects upwardly from the inner wall 6 of the lower drum member 4 while the second cylindrical portion 13 extends downwardly from a lower end of the first cylindrical portion 12 below the inner wall 6.

A pair of ball bearings 16 are fitted around and secured to an upper end portion of the first cylindrical portion 12 of the support shaft 11. The two bearings are annular and axially spaced from each other by a small distance. Another pair of annular ball bearings 17 are fitted around and secured respectively to an upper end portion and a lower end portion of the second cylindrical portion 13 of the support shaft 11.

Figure 4:
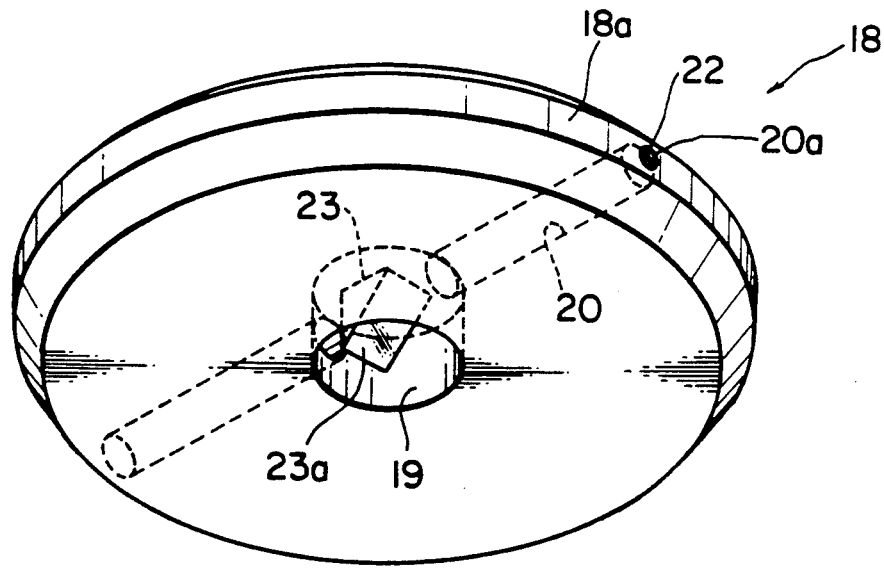
FIG. 4 is an enlarged perspective view of a first rotary member of the rotary optical head apparatus of FIG. 1 as viewed from below.

As FIGS. 1, 3 and 4 show, the first rotary member 18 is disposed for rotation inside the tape winding drum 2 and includes an objective lens set 22 including a pair of objective lenses, and a reflecting mirror 23.

The first rotary member 18 is shaped as a thick disk having a diameter a little smaller than the diameter of the outer periphery of the tape winding drum 2. The outer periphery of the first rotary member 18 is tapered at portions thereof on the opposite sides of a mid-portion 18a. The taper is such that the diameter of the first rotary member 18 decreases with increasing distance from the intermediate portion 18a in both the positive and negative axial directions. A circular supporting hole 19 is formed in the center of a lower portion of the first rotary member 18.

A light-passing hole 20 of a circular cross section is formed in, and extends in a radial direction through, the mid-portion 18a of the first rotary member 18. The light-passing hole 20 extends across a central portion of the top of the supporting hole 19 and is reduced in diameter at an outer end 20a thereof.

The objective lens set 22 is carried in a lens holder 21 disposed at a radially outer end portion of the light-passing hole 20 of the first rotary member 18.

The reflecting mirror 23 is mounted at a central portion of an upper end face of the supporting hole 19 of the first rotary member 18 so that a reflecting face 23a thereof is inclined by 45° with respect to both the optical axis of the objective lens set 22 and the vertical direction.

The ball bearings 16 are secured at outer peripheries thereof by a force fitting in a lower portion of the supporting hole 19 of the first rotary member 18 below the light-passing hole 20. The first rotary member 18 is thus supported for rotation at the upper end of the support shaft 11.

The first rotary member 18 is disposed for rotation in a space inside the tape winding drum 2 which is defined by an upper portion of an inside space of the lower drum member 4 and the recess 3a of the upper drum member 3. A central portion of the light-passing hole 20 is positioned at the same height as the gap 2a between the bottom and top faces of the upper and lower drum members 3 and 4.

The objective lens set 22 is provided to focus light reflected from the reflecting mirror 23 in the plane of the outer periphery of the tape winding drum 2. Accordingly, when the optical record tape 10 is wound on the tape winding drum 2, such light will be focused upon the record face of the optical record tape 10.

A substantially ring-shaped rotor magnet 24 is securely mounted on a lower face of the first rotary member 18, and a flexible circuit board 25 is mounted on an upper face of the inner wall 6 of the lower drum member 4 in an opposing relationship to the rotor magnet 24. A plurality of flat coils 26 are securely mounted in a circumferential row on an upper face of the circuit board 25 in an opposing relationship to the rotor magnet 24 with a small gap left therebetween.

Thus, a motor 27 of the flat opposing type is constituted from the rotor magnet 24, coils 26 and so forth, and when a predetermined drive current is supplied to the coils 26, a turning force is exerted in the rotor magnet 24 to thus rotate the first rotary member 18.

Figure 5:
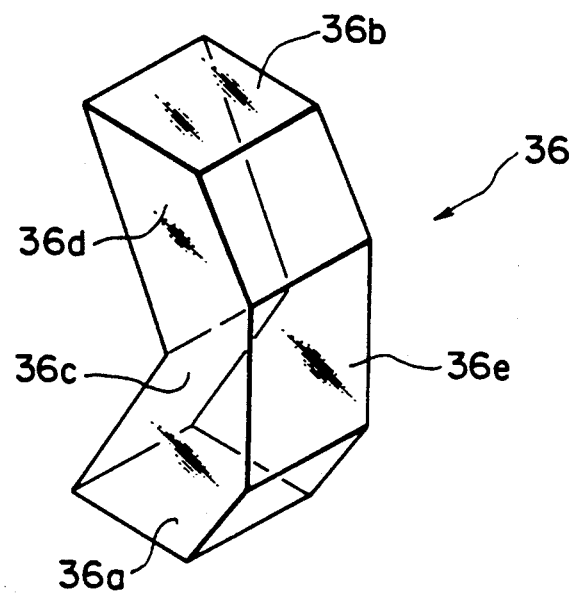
FIG. 5 is an enlarged perspective view of an image rotator of the rotary optical head apparatus of FIG. 1.

The second rotary member 28 is disposed for rotation inside the tape winding drum 2. The second rotary member 28 includes a prism holder 29 (FIGS. 1 and 3) carrying an image rotator 36 (FIG. 5) thereon and a holder supporting member 32 carrying the prism holder 29 thereon.

The prism holder 29 has a main portion 30 substantially in the form of a cylinder having an upper end partially closed and a flange 31 formed in an integral relationship with the main portion 30 and extending radially outwardly from a lower end of the main portion 30. A hole 30a is formed at a central portion of an upper end wall of the main portion 30, and a plurality of screw fitting holes 31a are formed at portions of the flange 31 along an outer circumferential edge.

The holder supporting member 32 has a portion 33 in the form of a cylinder having a greater diameter than the main portion 30 of the prism holder 29, and a flange 34 formed in an integral relationship with the cylindrical portion 33 and extending radially outwardly from an upper end of the cylindrical portion 33. A plurality of threaded holes 33a are formed on a lower end face of the cylindrical portion 33 of the holder supporting member 32, and a plurality of screws 35 are inserted from below in the screw fitting holes 31a formed in the flange portion 31 of the prism holder 29 and are screwed in the threaded holes 33a of the cylindrical portion 33 to couple the prism holder 29 and holder supporting member 32 in an integral, coaxial relationship with each other.

The image rotator 36 (FIGS. 1 and 5) is made of a known prism material and has a flat horizontal input face 36a and a flat horizontal output face 36b formed parallel to each other at the bottom and top ends thereof and each having a substantially square shape, an input side inclined reflecting face 36c and an output side inclined reflecting face 36d positioned in such a manner as to form substantially an L-shape relative to each other, and a flat intermediate vertical reflecting face 36e opposed to the input and output side reflecting faces 36c and 36d. The image rotator 36 is constituted so that light introduced into the input face 36a substantially in a vertical direction from below is successively reflected by the input side inclined reflecting face 36c, intermediate vertical reflecting face 36e and output side inclined reflecting face 36d and is then radiated in a substantially perpendicular direction from the output face 36b, but light introduced into the output face 36b is successively reflected but in a reverse order to that described above and then is radiated from the input face 36a. Accordingly, when input light is deflected in a direction having a component perpendicular to the intermediate reflecting face 36e, output light is deflected in a direction different from the direction of such deflection.

The image rotator 36 is disposed inside the main portion 30 of the prism holder 29 in such a manner that it has an axis of rotation perpendicular to the input and output faces 36a and 36b thereof and positioned just on an axis of the prism holder 29. Such coaxial condition is maintained by suitable means not shown.

The ball bearings 17 are secured in the cylindrical portion 33 of the holder supporting member 32 by force fitting to support the second rotary member 28 for rotation at a lower portion of the support shaft 11.

Since the first rotary member 18 and the second rotary member 28 are supported on the single support shaft 11 in this manner, their coaxial condition is ensured with a high degree of accuracy. Accordingly, the center of rotation of the objective lens set 22 and the center of rotation of the image rotator 36 coincide with each other with a high degree of accuracy.

Another ring-shaped rotor magnet 37 is securely mounted on an upper face of the flange 34 of the holder supporting member 32. A flexible circuit board 38 is mounted on a lower face of the inner wall 6 of the lower drum member 4 in an opposing relationship to the rotor magnet 37. A plurality of flat coils 39 are securely mounted in a circumferential row on a lower face of the circuit board 38 in such a manner that the coils 39 and the rotor magnet 37 are opposed to each other with a small gap left therebetween.

Thus, a motor 40 of the flat opposing type is constituted by the rotor magnet 37, coils 39 and so forth, and when a predetermined drive current is supplied to the coils 39, a turning force is exerted in the rotor magnet 37 to rotate the second rotary member 28.

The second rotary member 28 is rotated at an angular velocity equal to one-half the angular velocity of the first rotary member 18 and in a direction that is the same as the direction of rotation of the first rotary member 18.

Figure 6:
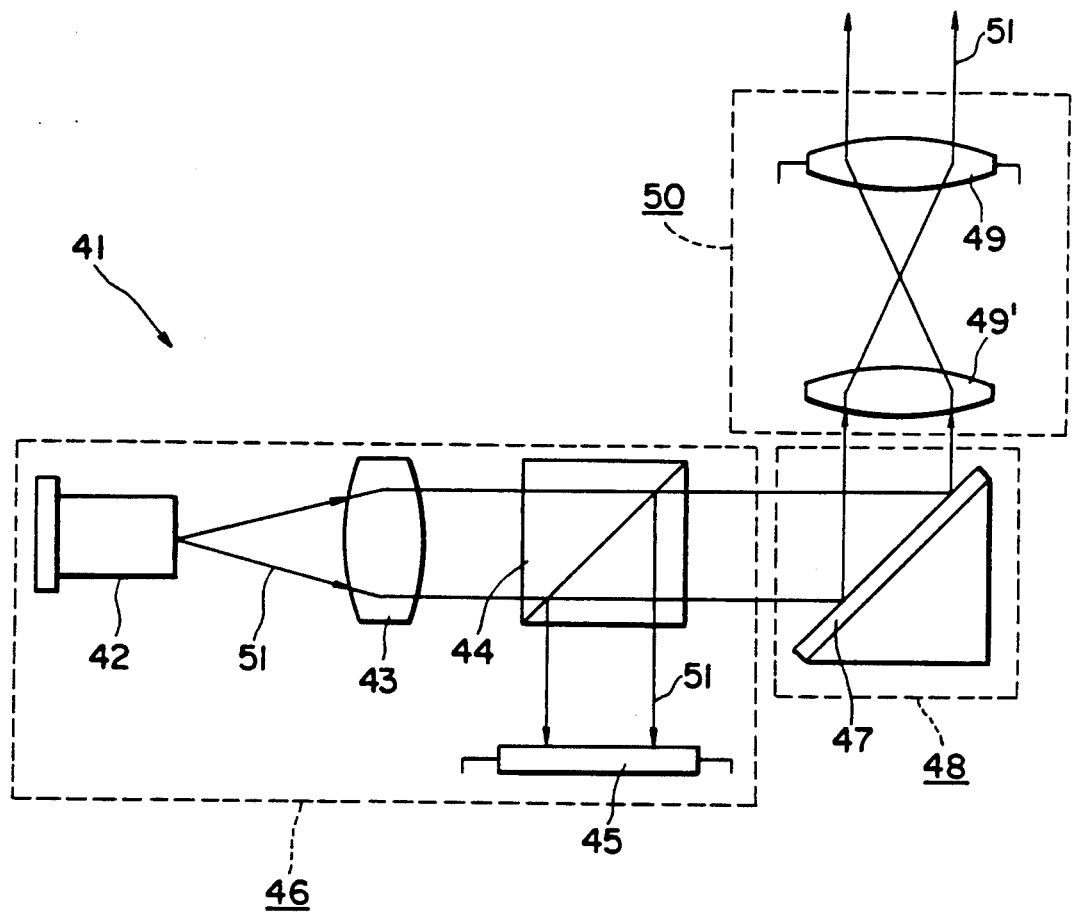
FIG. 6 is a schematic side elevational view of an optical system of the rotary optical head apparatus of FIG. 1.

The rotary optical head apparatus 1 further includes an optical system 41 (FIGS. 1 and 6) which effects radiation and deflection of a recording/reproducing beam and a servo beam, detection of return light and so forth. The optical system 41 includes a light radiating-/receiving block 46 including a semiconductor laser 42, a collimating lens 43, a beam splitter 44, an optical detector 45, a light diffracting grating (not shown), and so forth. The optical system 41 further includes a tracking block 48 including a galvanometer mirror (galvanomirror) 47 for the tracking servo secured to a shaft of a galvanometer (not shown). The optical system 41 further includes a focusing block 50 including a pair of lenses 49 and 49' for the focusing servo, a voice coil actuator (not shown) for supporting the lens 49 thereon, and so forth. The optical system 41 is disposed so that the focusing block 50 is opposed from below to the image rotator 36 as seen in FIG. 1.

With the optical system 41, a laser beam 51 (FIGS. 1, 6 and 8) propagated from the semiconductor laser 42 is split into a main beam for the recording or reproduction and a plurality of sub-beams for the servoing by a suitable beam splitting element (not shown). The main and sub-beams are changed into parallel beams of light by the collimating lens 43 and then impinge on the beam splitter 44, whereafter they impinge upon and are reflected by the galvanomirror 47 toward the focusing block 50. Then, they successively pass the focusing lenses 49' and 49 and are introduced into the image rotator 36 by way of the input face 36a. Thereafter, they are propagated from the image rotator 36 and introduced to the reflecting mirror 23 through an inner bore formed in the support shaft 11. Thus, they are reflected toward the objective lens set 22 by the reflecting mirror 23 so that they are subsequently focused by the objective lens set 22 to spot 52 of a predetermined diameter on the record face of the optical record tape 10. Upon reproduction, the sub-beams and return light of the laser beam 51 are introduced into the optical detector 45 by way of the objective lens set 22, reflecting mirror 23, image rotator 36, focusing lenses 49 and 49', galvanomirror 47 and beam splitter 44 so that detection of an error signal or reading of a record signal may be performed by the optical detector 45.

Then, the focusing lens 49 and the galvano-mirror 47 are adjusted in response to such error signal to effect respectively focusing and tracking of the beam spot 52.

Figure 7:
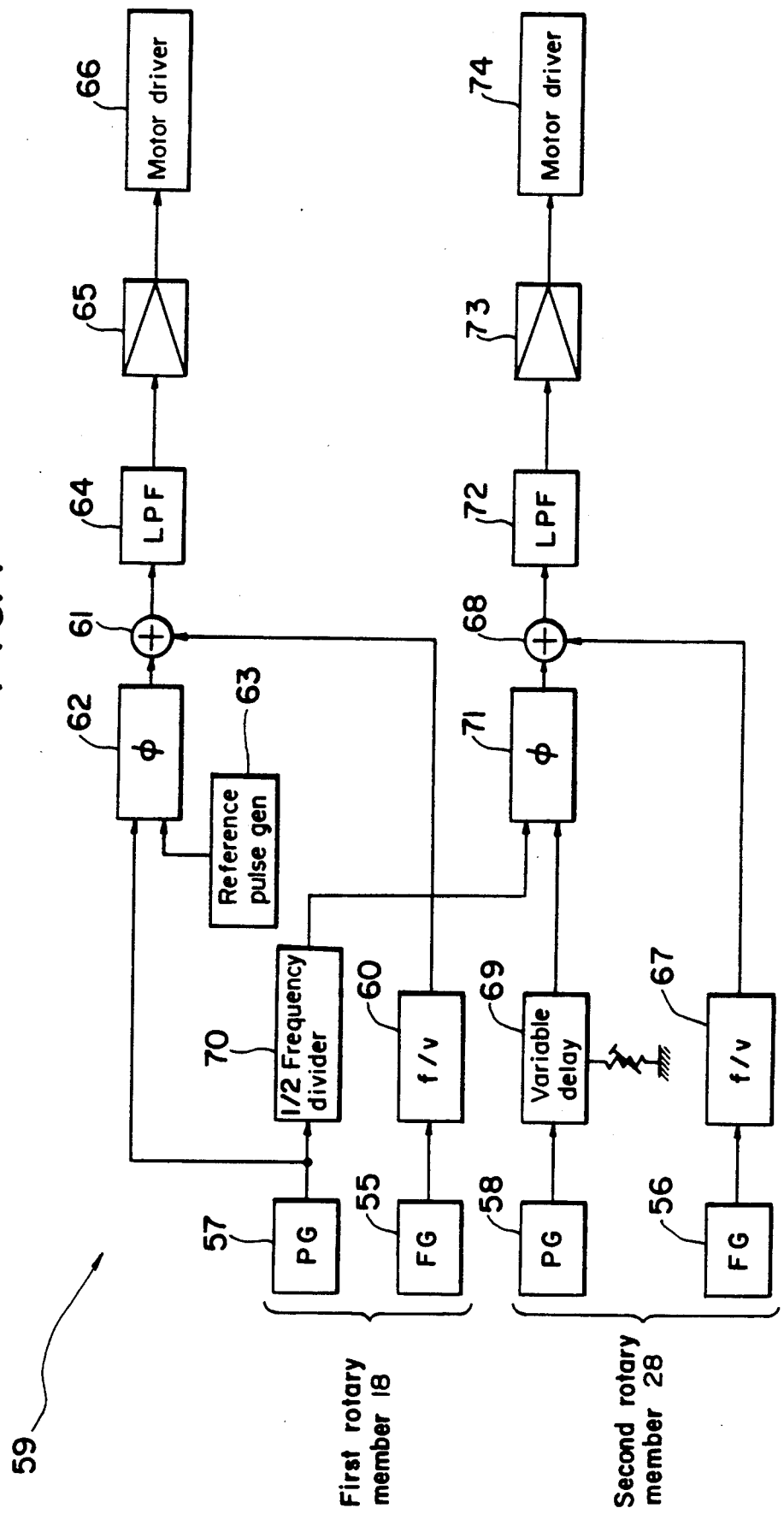
FIG. 7 is a block circuit diagram of a servo system for rotary members of the rotary optical head apparatus of FIG. 1.

Magnetization patterns different from the magnetization patterns of the motors 27 and 40 described above are formed on an outer periphery 24a (FIGS. 1 and 3) of the rotor magnet 24 mounted on the first rotary member 18 and an outer periphery 37a of the rotor magnet 37 mounted on the second rotary member 28. Meanwhile, a pair of Hall elements 53 and 54 are mounted separately at two locations on an inner periphery of the outer circumferential wall 5 of the lower drum member 4 in an opposing relationship to the rotor magnets 24 and 37, respectively. Thus, first rotational frequency detecting means 55 (FIGS. 1 and 7) for detecting a rotational frequency or speed of the first rotary member 18 is constituted by the FG magnetization pattern portion 24a of the rotor magnet 24 and the Hall element 53, and second rotational frequency detecting means 56 for detecting a rotational frequency or speed of the second rotary member 28 is constituted by the FG magnetization pattern portion 37a of the rotor magnet 37 and the Hall element 54.

First position detecting means 57 (FIGS. 1 and 7) is provided for detecting a reference position of the first rotary member 18. The first position detecting means 57 includes a movable element 57a mounted at a predetermined position of an upper face proximate to an outer periphery of the first rotary member 18, and a fixed element 57b mounted at a predetermined position of a bottom face proximate to an outer periphery of the upper drum member 3.

Second position detecting means 58 is also provided for detecting a reference position of the second rotary member 28. The second position detecting means 58 includes a movable element 58a mounted at a predetermined position of an outer periphery of the flange 34 of the holder supporting member 32, and a fixed element 58b mounted at a predetermined position of an inner periphery of the outer circumferential wall 5 of the lower drum member 4 at a height which is the same as that of the flange 34.

Special means dedicated solely to the detection of position need not be provided. For example, the FG magnetization patterns 24a and 37a may be varied from one portion to another so that signals obtained from the varied portions may be used for position detection.

A servo circuit 59 (FIG. 7) is provided for controlling the rotational speeds and phases of the first and second rotary members 18 and 28.

A frequency-to-voltage converting circuit 60 is connected to the first rotational frequency detecting means 55 and converts the frequency of a signal received from the Hall element 53 of the first rotational frequency detecting means 55 into a voltage. An output voltage of the frequency-to-voltage converting circuit 60 is transmitted by way of an adding section 61 to a low-pass filter 64 which will be hereinafter described.

A phase comparing circuit 62 is connected to the first position detecting means 57 and a reference pulse generating section 63 and compares the phase of a pulse signal received from the fixed element 57b of the first position detecting means 57 with the phase of another pulse signal received from the reference pulse generating section 63. An output signal of the phase comparing circuit 62 indicative of a difference between the compared phases of the received signals is transmitted to the adding section 61.

Thus, a signal having passed the adding section 61 is received by the low-pass filter 64 and then successively passes the low-pass filter 64 and an amplifier 65 connected to the low-pass filter 64. The signal is then transmitted to a motor driving circuit 66 for the motor 27 for the first rotary member 18 and is used to control the rotational speed of the first rotary member 18.

Another frequency-to-voltage converting circuit 67 is connected to the second rotational frequency detecting means 56 and converts the frequency of a signal received from the Hall element 54 of the second rotational frequency detecting means 56 into a voltage. An output voltage of the frequency-to-voltage converting circuit 67 is transmitted to another adding section 68.

A variable delay circuit 69 is connected to the fixed element 58b of the second position detecting means 58. A suitable delay time is set in the variable delay circuit 69 upon initialization of the servo circuit 59.

A one-half frequency divider circuit 70 is connected to the first position detecting means 57 and divides the frequency of a signal received from the fixed element 57b of the first position detecting means 57 by two. An output signal of the divider circuit 70 and a pulse signal having passed the delay circuit 69 are compared with each other by a phase comparing circuit 71, and an output signal of the phase comparing circuit 71 indicative of a difference between the compared phases of the received signals is transmitted to the adding circuit 68.

A signal having passed the adding section 68 is then successively introduced into a low-pass filter 72 and an amplifier 73 and received by a motor driving circuit 74 for the motor 40 for the second rotary member 28. The signal is thus used to control the rotational speed of the second rotary member 28 so that it is equal to one-half the rotational speed of the first rotational member 18 and also to control the rotational phase of the second rotary member 28 with respect to the rotational phase of the first rotary member 18.

Thus, since the second rotary member 28 is rotated at a speed equal to one-half the rotational speed of the first rotary member 18, the image rotator 36 is rotated at a speed equal to one-half the rotational speed of the reflecting mirror 23.

FIGS. 8A-8E show variations of the direction of deflection of the laser beam 51 in the path of light from the galvanomirror 47 toward the image rotator 36, the direction of deflection of the laser beam 51 in the path of light from the image rotator 36 toward the reflecting mirror 23, and the direction of deflection of the laser beam 51 in the path of light from the reflecting mirror 23 to the objective lens set 22 (such directions of deflection are indicated by widened arrow marks in FIGS. A-8E) when the galvanomirror 47 is rocked in one direction (in the counterclockwise direction in FIGS. 8A-8E). In these figures the reflecting mirror 23, which is housed in the first rotary member 18, is represented at successive angular positions separated by 90°. That is, FIG. 8A shows an angular position of 0°, FIG. 8B an angular position of 90°, FIG. 8C an angular position of 180°, FIG. 8D an angular position of 270°, and FIG. 8E an angular position of 360°, which is the same as 0°. The corresponding angular positions of the image rotator 36 are respectively 0°, 45°, 90°, 135° and 180°. As FIGS. 8A-8E show, the direction of deflection of the laser beam 51 by the galvanomirror 47 and the direction of de-flection of the laser beam 51 advancing from the reflecting mirror 23 to the objective lens set 22, or in other words, the direction of movement of the beam spot 52, normally coincide with each other.

While the support shaft 11 in the embodiment described above is formed as an independent member separate from both the first and second rotary members, such support shaft may be formed in an integral relationship with either one of the first and second rotary members while the other rotary member is supported for rotation on the support shaft.

It will be apparent to one of ordinary skill in the art that many changes and modifications can be made to the preferred embodiment of the invention as described above without departing from the spirit and scope of the invention. The invention is therefore limited only by the appended claims.

We claim:

1. A rotary optical head apparatus comprising:
objective lens means;
beam generating means for generating a beam for propagation to said objective lens means along a beam path;

first rotary means mounting said objective lens means;

image rotator means;

second rotary means mounting said image rotator means in said beam path;

support shaft means for commonly supporting said first and second rotary means for rotation about a common axis;

first driving means for rotating said first rotary means together with said objective lens means about said axis at a given rotational speed; and second driving means for rotating said second rotary means together with said image rotator means about said axis at a speed equal to one-half said given rotational speed.

2. A rotary optical head apparatus according to claim 1 wherein said support shaft means is formed with a bore and said beam path extends through said bore between said image rotator means and said objective lens means.

3. A rotary optical head apparatus according to claim 2 wherein said second rotary means is located below said first rotary means and a beam entering said second rotary means from below is introduced to said objective lens means by way of said image rotator means and through said bore.

4. A rotary optical head apparatus according to claim 3 further comprising beam reflection means mounted by said first rotary means, said beam reflection means being interposed in said beam path between said bore and said objective lens means.

5. A rotary optical head apparatus according to claim 4 further comprising first magnet means mounted on said first rotary means, said first magnet means forming part of said first driving means; and second magnet means mounted on said second rotary means, said second magnet means forming part of said second driving means.

6. A rotary optical head apparatus according to claim 5 wherein said first driving means further comprises first fixed winding means opposed to said first magnet means and said second driving means further comprises second fixed winding means opposed to said second magnet means.

7. A rotary optical head apparatus according to claim 1 further comprising galvanometer mirror means interposed in said beam path for deflecting said beam, said galvanometer mirror means being capable of a rocking motion for deflecting said beam as reflected by said galvanometer mirror means.

8. A rotary optical head apparatus according to claim 7 wherein said galvanometer mirror means is positioned between said beam generating means and said image rotator means.

9. A rotary optical head apparatus according to claim 7 further comprising beam reflection means mounted on said first rotary means, said beam reflection means being interposed in said beam path between said bore and said objective lens means and wherein said galvanometer mirror means is mounted so that a deflection in a given direction of said beam as reflected by said galvanometer mirror means produces a deflection in the same direction of said beam as reflected by said reflection means.

* * * * *